May 6, 1958     B. G. FLETCHER     2,833,511
VALVE MECHANISMS

Filed July 22, 1955     3 Sheets-Sheet 1

Inventor
B. G. Fletcher
By Glascock Downing Liebold
Attys.

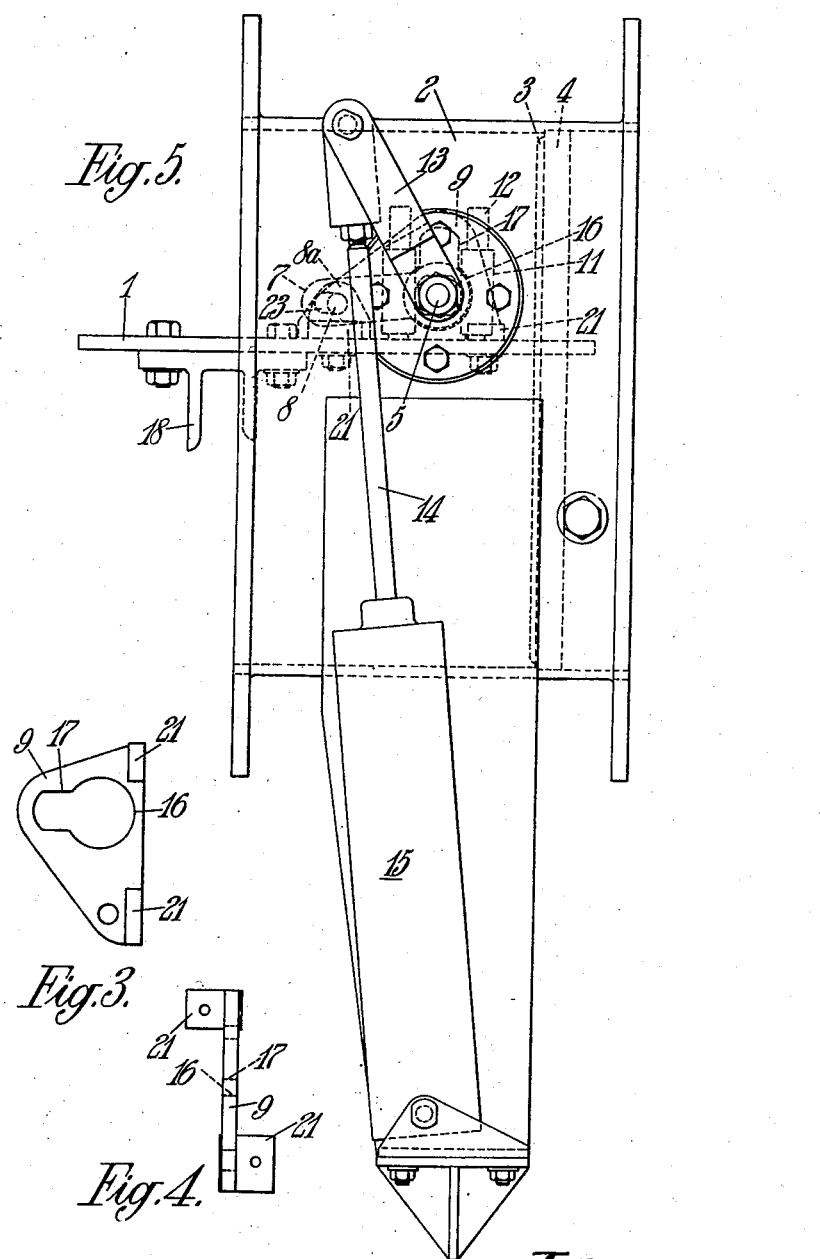

United States Patent Office 2,833,511
Patented May 6, 1958

2,833,511

VALVE MECHANISMS

Bertram Godsall Fletcher, London, England, assignor to The British Ceca Company Limited and F. W. Berk & Company Limited, both of London, England Application July 22, 1955, Serial No. 523,847

Claims priority, application Great Britain December 21, 1954

4 Claims. (Cl. 251—218)

This invention relates to valve mechanisms for controlling the flow of liquids or gases through pipes or conduits and is more particularly concerned with valve mechanisms of the butterfly damper type which are of such a kind as to provide an effective and continuous seal when in the shut position and a free and unrestricted passage through the pipe or conduit when in the open position.

The invention has for its main object to provide certain improvements in the valve mechanism described in British Patent No. 652,635 dated February 7, 1949, and the invention accordingly consists in a valve mechanism for controlling the flow of liquids or gases through a pipe or conduit comprising a movable member engageable with a seating so as to form a closure within the pipe or conduit when in the shut position, said movable member being controlled by a shaft or trunnion which is connected to said movable member by one or more lever members and is arranged to pass through one or more bosses disposed within one or more slotted brackets or like devices carried on said movable member, said bosses and said slotted brackets or like devices being so shaped and arranged with respect to each other that a preliminary rotational movement of said shaft effects a limited longitudinal movement of said movable member away from its seat while a further rotational movement of said shaft causes said movable member to swing into the open position.

According to the preferred arrangement, each of said brackets or like devices has a slot which is in part circular and in part straight sided, and each of said bosses is of overall circular shape for making rotary engagement with the circular part of said slot but has flattened side parts for making slidable engagement with the straight sided part of said slot, said brackets being so arranged with respect to said shaft that when the valve is in the shut position, the flattened side parts of said bosses are in engagement with the straight sided parts of said slots whereby preliminary rotation of said shaft causes said movable member and brackets to slide longitudinally until said bosses are disposed in the circular parts of said slots and are clear of the straight sided parts so as to permit the movable member to be swung into the open position by the further rotation of the shaft.

The invention will be more completely understood from the following detailed description which is given in conjunction with the accompanying drawings, in which:

Figures 3 and 4 are enlarged end and plan views respectively of one of the guide members employed for controlling the movement of the valve and for locking it against rotation until a predetermined longitudinal movement has been effected; and Figure 5 is a side view of the valve mechanism similar to Figure 1 but showing the valve in the open position.

Figure 1:
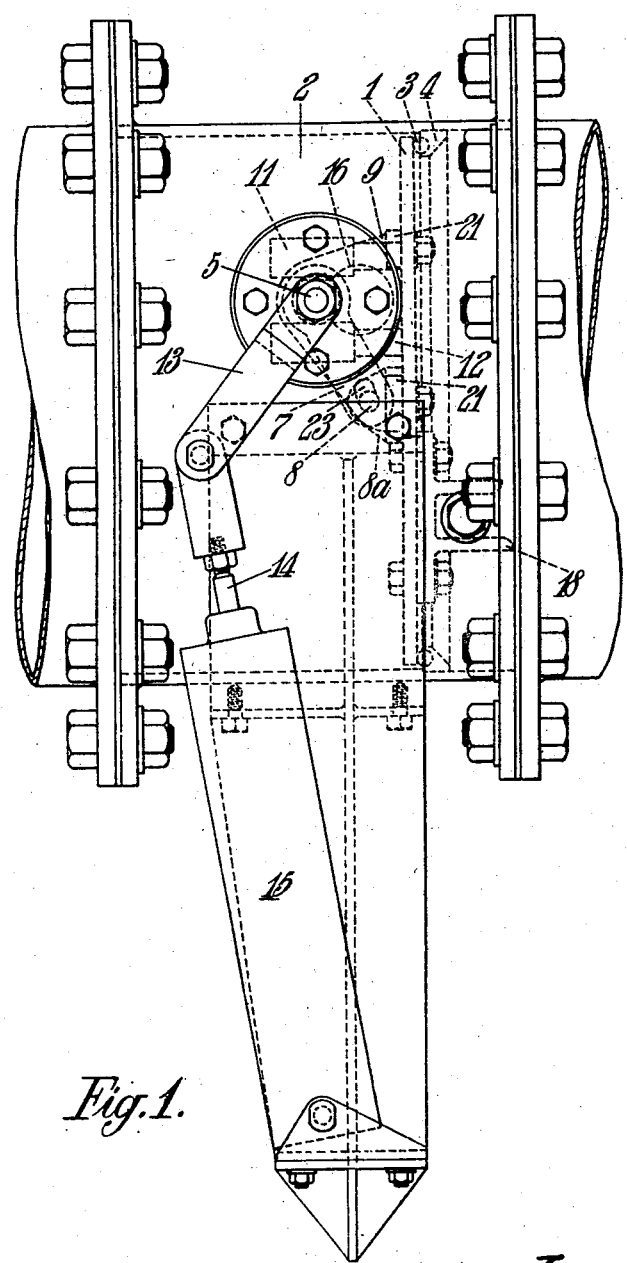
Figure 1 is a side view of a section of pipe with a valve mechanism constructed in accordance with the invention shown in the shut position.
Figure 2:
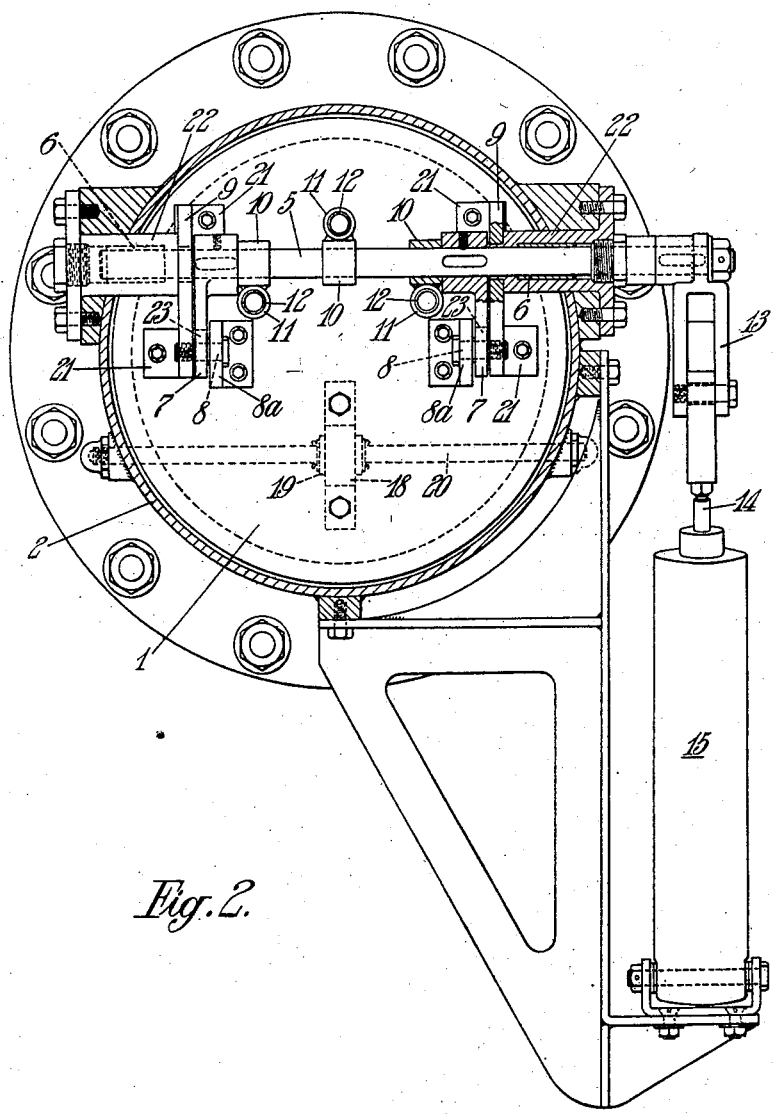
Figure 2 is a cross-sectional view of the pipe showing a sectional end view of the valve mechanism.

Referring now to these drawings, the valve mechanism is constructed in the form of substantially circular shaped disc or plate 1 which forms the movable part of the valve and is adapted to fit across the pipe or conduit 2 to be controlled, the peripheral part of this disc or plate 1 being arranged to engage with a sealing gasket 3 disposed on an annular valve seating 4 formed on the interior of the pipe 2, the sealing gasket 3 being formed of resilient material so that the valve forms an airtight closure when it is in the shut position as shown.

The valve is supported and controlled by a shaft 5 which is mounted in bearings 6 in the pipe or conduit 2 and carries a pair of lifting arms 7, the ends of which are connected to a pair of bolts 8 rigidly fixed to the face of the valve plate 1, these bolts 8 being secured between a pair of fixing brackets 8a, and a pair of pivot brackets 9 as shown. The shaft 5 passes through a pair of bosses 22 which are mounted upon the pipe or conduit and project into the aforesaid pivot brackets 9 which are secured by lugs 21 to the valve plate 1, the shaft 5 also passing through three collars 10 each of which carries a sleeve guide 11 in each of which a cylindrical slide rod 12 mounted on the valve 1 is arranged. The shaft 5 does not pass through the central axis of the pipe 2 but is slightly eccentrically arranged as shown and is keyed to one end of a lever 13, the other end of which is pivoted to a piston rod 14 controlled by a hydraulic or compressed air cylinder 15 although it is to be understood that this piston and cylinder may be substituted by a hand lever or any other suitable form of control. Alternatively, a single centrally arranged lifting arm may be employed in place of the two lifting arms 7 as shown.

The pivot brackets 9 are slotted as shown in Figure 3 to provide an aperture, the lower part 16 of which is circular and the upper part 17 of which is straight sided having a width less than the diameter of the circular lower part. The bosses 22 are deformed at the points where they pass through the pivot brackets and each boss is cut away to provide a pair of flats at each side of the boss so as to permit this part of the boss to fit into the straight sided part 17 of the slots in the pivot brackets 9 when the valve is in the shut position, the circular part 16 of the brackets being of such diameter as to accommodate the bosses when the valve is in the open position.

The base of the valve plate 1 has a forked projection 18 which serves as a locking device and is adapted to engage with a roller 19 mounted on a stationary shaft 20 when the valve is in the shut position, one arm of the forked projection being slightly shorter than the other to facilitate engagement with the roller 19 as the valve closes.

With this arrangement, the operation of the mechanism is as follows: assuming the valve to be in the shut position, the mechanism will be in the position shown in Figure 1 with the flattened parts of the bosses 22 engaging with the straight sided parts of the slots in the brackets 9. Thus when a force is applied to move the lever 13 in a clockwise direction in order to open the valve, pivotal movement of the valve plate and brackets 9 will at first be prevented and a preliminary rotation of the shaft 5 will thus cause the valve plate 1 to slide back longitudinally on the guide rods 12 until the circular parts 16 of the brackets 9 engage with the bosses 22. When this position is reached, the forked projection 18 will be substantially clear of the roller 19 and the brackets 9 will be free to rotate about the bosses 22 so that further rotation of the shaft 5 will swing the valve into the open position as shown in Figure 5. As soon as this swinging movement commences, the flattened parts of the bosses 22 will move out of alignment with the straight parts 17 of the slots in the brackets 9 and the shaft and bosses will thus be positively locked within the circular parts 16 of the slots so that once the preliminary longitudinal movement of the valve has been effected, it will be automatically locked against any further longitudinal movement while it is being rotated, the same action applying in reverse when the valve is being closed.

It will also be apparent that owing to the cooperation of the flattened parts of the bosses 22 with the straight sided parts 17 of the slots in the brackets 9 during the preliminary longitudinal movement of the valve, any rotational or swinging movement of the valve during this preliminary longitudinal movement will be positively prevented.

It is to be understood that the invention is not to be regarded as being limited to the particular arrangement hereinbefore described which is given purely by way of example, and that the invention has many and varied applications, since it can obviously be readily employed in any system in which it is desirable to be able to provide valve facilities for giving unrestricted passage through a pipe or conduit and for providing a continuous seal for closing said pipe or conduit completely.

The invention is thus particularly applicable to extraction or recovery processes using, for example, activated carbon as an absorption agent, since in such processes a large number of valves for controlling the passage of the fluids and gases are required and by using valve mechanism according to the invention a great saving in expense and material can be achieved and the valves are considerably more speedy and efficient in their operation than is possible with valves of the kind previously known.

I claim:

1. Valve mechanism for controlling the flow of fluids through a pipe, comprising a movable member engageable with a seating so as to form a closure within the pipe when in the shut position, said movable member being controlled by a shaft which is connected to said movable member by lever members, and is arranged to pass through bosses disposed within slotted brackets carried on said movable member, each of said brackets having a slot which is in part circular and in part parallel sided, and each of said bosses being of overall circular shape for making rotary engagement with the circular part of said slot but having flattened side parts for making slidable engagement with the parallel sided part of said slot, said brackets being so arranged with respect to said shaft that when the valve is in the shut position, the flattened side parts of said bosses are in engagement with the parallel sided parts of said slots, whereby preliminary rotation of said shaft causes said movable member and brackets to slide longitudinally away from said seating until said bosses are disposed in the circular parts of said slots, and are clear of the parallel sided parts, so as to permit said movable member to be swung into the open position by the further rotation of the shaft.

2. Valve mechanism as claimed in claim 1, wherein said shaft and said movable member are provided with co-operating guide rods and sleeves for ensuring a smooth slidable movement of the valve plate way from its seat during initial opening movement and towards its seat during final closing movement and preventing any lateral movement of the valve plate with respect to said shaft.

3. Valve mechanism as claimed in claim 1, wherein said brackets are mounted on the rear face of said movable member remote from said seating, and wherein said bosses are of tubular form and are secured to said pipe so as to surround the bearings of the shaft and project into the slots in said brackets.

4. Valve mechanism as claimed in claim 1, wherein the front face of said movable member adjacent said seating has a forked projection which is engageable with a stop on said pipe when the valve moves into the shut position, said stop being provided with a roller member for facilitating engagement between the forked projection and the stop as contact between them is effected.

References Cited in the file of this patent

UNITED STATES PATENTS

| 2,097,285 | Lundgren | Oct. 26, 1937 |
| 2,710,737 | Schaupp | June 14, 1955 |

FOREIGN PATENTS

| 335,462 | Great Britain | 1930 |